United States Patent
Tanaka et al.

(10) Patent No.: US 11,742,148 B2
(45) Date of Patent: Aug. 29, 2023

(54) SEPARATOR FOR ALUMINUM ELECTROLYTIC CAPACITOR, AND ALUMINUM ELECTROLYTIC CAPACITOR

(71) Applicant: NIPPON KODOSHI CORPORATION, Kochi (JP)

(72) Inventors: Kosuke Tanaka, Kochi (JP); Naoki Fujimoto, Kochi (JP); Atsushi Igawa, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 161 days.

(21) Appl. No.: 17/422,818

(22) PCT Filed: Dec. 4, 2019

(86) PCT No.: PCT/JP2019/047399
§ 371 (c)(1),
(2) Date: Jul. 14, 2021

(87) PCT Pub. No.: WO2020/149039
PCT Pub. Date: Jul. 23, 2020

(65) Prior Publication Data
US 2022/0068569 A1  Mar. 3, 2022

(30) Foreign Application Priority Data
Jan. 16, 2019  (JP) .................. 2019-004909

(51) Int. Cl.
*H01G 9/045* (2006.01)
*H01G 9/02* (2006.01)

(52) U.S. Cl.
CPC ............ *H01G 9/045* (2013.01); *H01G 9/02* (2013.01)

(58) Field of Classification Search
CPC ...................................................... H01G 9/02
See application file for complete search history.

(56) References Cited

U.S. PATENT DOCUMENTS

| 4,593,343 A | * | 6/1986 | Ross | H01G 9/02 361/324 |
| 2002/0045091 A1 | * | 4/2002 | Kamei | H01M 50/403 429/62 |
| 2017/0053745 A1 | * | 2/2017 | Aoyama | H01G 9/035 |
| 2018/0366275 A1 | | 12/2018 | Fukuoka et al. | |

FOREIGN PATENT DOCUMENTS

| JP | S53-142652 A | 12/1978 |
| JP | H03-222315 A | 10/1991 |
| JP | H05-267103 A | 10/1993 |
| JP | H05-315193 A | 11/1993 |
| JP | H08-250376 A | 9/1996 |
| JP | 2001-189239 A | 7/2001 |
| JP | 2010-135313 A | 6/2010 |
| JP | 2017-112370 A | 6/2017 |

OTHER PUBLICATIONS

Sep. 29, 2022 Extended Serach Report Issued in European Patent Application No. 19 910 210.4.

* cited by examiner

*Primary Examiner* — Eric W Thomas
(74) *Attorney, Agent, or Firm* — Oliff PLC

(57) ABSTRACT

A separator for an aluminum electrolytic capacitor. The separator makes it possible to use inexpensive fibers and has excellent impedance characteristics and short-circuit resistance performance. When the separator for an aluminum electrolytic capacitor is interposed between a positive electrode and a negative electrode of an aluminum electrolytic capacitor and 500 V are applied during separator dielectric breakdown testing, the separator for an aluminum electrolytic capacitor has a short-circuit rate of no more than 10%.

2 Claims, No Drawings

SEPARATOR FOR ALUMINUM ELECTROLYTIC CAPACITOR, AND ALUMINUM ELECTROLYTIC CAPACITOR

TECHNICAL FIELD

The present invention relates to a separator for an aluminum electrolytic capacitor suitable for use in an aluminum electrolytic capacitor, and the aluminum electrolytic capacitor using the separator for an aluminum electrolytic capacitor.

BACKGROUND ART

In general, an aluminum electrolytic capacitor is prepared by preparing a capacitor element with an electrolytic paper, as a separator, interposed between a positive electrode aluminum foil and a negative electrode aluminum foil, impregnating the capacitor element with an electrolytic solution, inserting the capacitor element into a case, and then, sealing the case.

In the aluminum electrolytic capacitor, the main role of the separator is to isolate both the electrodes and to retain the electrolytic solution. In order to isolate both the electrodes, the separator is required to have high shielding properties while having low resistance. Further, a material of the separator is required to have electrical insulation, and is required to have hydrophilicity and lipophilicity in order to retain various kinds of electrolytic solutions. Therefore, a separator, which is made of cellulose as a raw material and has these characteristics together, has been used.

As a separator for an aluminum electrolytic capacitor, chemical pulps for papermaking, which is a plant fiber digested and extracted from wood, non-wood or the like by a sulfate (kraft) method, a sulfite method, or an alkali method, has been used.

Various configurations have been proposed so far as separators for electrochemical elements including aluminum electrolytic capacitors (see, for example, Patent Literatures 1 to 5).

CITATION LIST

Patent Literature

Patent Literature 1: JP S53-142652 A
Patent Literature 2: JP H3-222315 A
Patent Literature 3: JP H5-267103 A
Patent Literature 4: JP H5-315193 A
Patent Literature 5: JP H8-250376 A

SUMMARY OF INVENTION

Technical Problem

Among the aluminum electrolytic capacitors, a separator using techniques described in Patent Literatures 1 and 2, that is, a cylinder multilayer separator including a Manila hemp pulp and an esparto pulp, or the like are generally used particularly in a low-voltage region, which is a voltage region of no more than 100 V.

However, the Manila hemp pulp and the esparto pulp are mainly produced in the Philippines and Tunisia, respectively, and are becoming difficult to obtain year by year, and the price has been continuously increased due to the recent political instability and a decrease in primary industry workers. Therefore, there is an urgent issue to develop alternative products using stably available raw materials.

In the aluminum electrolytic capacitor, the separator greatly affects impedance characteristics, particularly, equivalent series resistance (ESR). It is known that the impedance characteristics decrease as a cross-sectional shape of a pulp used for the separator is closer to a circular shape and a diameter thereof is thinner.

A pulp derived from wood, such as a softwood pulp and a hardwood pulp, has a large production amount and can be stably obtained. However, the wood pulp has a flat cross-sectional shape and a large size, and thus, is not suitable as a raw material for a low-voltage separator that places importance on impedance characteristics.

Patent Literature 3 proposes a separator using beaten solvent-spun cellulose fibers. The solvent-spun cellulose fiber is an industrial product, and thus, can be stably obtained, and is also excellent in impedance characteristics since a cross-sectional shape of the beaten fiber is circular and thin.

However, the solvent-spun cellulose fiber is expensive, and thus, cannot be used as a substitute for the Manila hemp pulp or esparto pulp.

Examples of the non-wood pulp that is industrially mass-produced and is available at a relatively low cost include a malvaceae pulp, a tiliaceae pulp, and a poaceae pulp.

As separators for aluminum electrolytic capacitors using the poaceae pulp other than esparto, Patent Literature 4 proposes a separator using straw fibers and a Manila hemp pulp, and Patent Literature 5 proposes a separator using a bamboo pulp.

However, both Patent Literature 4 and Patent Literature 5 aim to improve sound quality of acoustic equipment. A mainly required characteristic for a separator for the acoustic equipment is sound quality felt by humans, and is greatly different from impedance characteristics required for a general low-voltage separator.

Many plant-derived parenchymal cells are contained in the malvaceae pulp, the tiliaceae pulp, and the poaceae pulp, and the parenchymal cells are very wide and short as compared with the pulp. If many parenchymal cells are present in a separator, there occur problems such as deterioration of impedance characteristics and deterioration of tensile strength and tear strength. In addition, the malvaceae pulp, the tiliaceae pulp, and the poaceae pulp have a shorter average fiber length of the main fibers and inferior strength characteristics, such as tensile strength and tear strength, as compared with the softwood pulp, the Manila hemp pulp, and the like. Therefore, it is difficult to realize short-circuit resistance performance and impedance performance, required for a general low-voltage separator, with a separator formed only of the malvaceae pulp, the tiliaceae pulp, and the poaceae pulp.

In aluminum electrolytic capacitors, separators serve to isolate electrodes.

Examples of short circuits of aluminum electrolytic capacitors related to separators include: "compression or breakage of a separator by a tab portion", "penetration or breakage of a separator due to burrs at an end of an electrode foil or burrs at an electrode foil and a lead wire connection portion", "breakage of a separator due to mechanical stress such as a vibration and an impact", "electrical stress such as spark discharge", "oxide film dielectric breakdown derived from an oxide film defect portion during aging at the time of producing a capacitor", and the like. Resistance to such causes of the short circuit is affected by uniformity and strength characteristics of separators, but the improvement of short-circuit resistance performance is an endless problem for the separators.

An object of the present invention is to provide a separator for an aluminum electrolytic capacitor that is capable of using inexpensive fibers, such as a malvaceae pulp, a tiliaceae pulp, and a poaceae pulp, and is excellent in short-circuit resistance performance and impedance characteristics.

In addition, another object of the present invention is to provide an aluminum electrolytic capacitor which includes the separator for an aluminum electrolytic capacitor and is excellent in short-circuit resistance performance and impedance characteristics.

Solution to Problem

A separator for an aluminum electrolytic capacitor of the present invention is a separator for an aluminum electrolytic capacitor interposed between a positive electrode and a negative electrode of the aluminum electrolytic capacitor and having a short-circuit rate of no more than 10% when 500 V are applied during separator dielectric breakdown testing.

An aluminum electrolytic capacitor of the present invention includes a positive electrode, a negative electrode, and a separator interposed between the positive electrode and the negative electrode, and the above-described separator for an aluminum electrolytic capacitor of the present invention is used as the separator.

Advantageous Effects of Invention

According to the present invention described above, it is possible to provide the separator for an aluminum electrolytic capacitor and the aluminum electrolytic capacitor using the separator excellent in short-circuit resistance performance and impedance characteristics.

In addition, since the short-circuit rate at the time of applying 500 V during the separator dielectric breakdown testing is no more than 10% according to the present invention, the separator can be formed using inexpensive fibers such as a malvaceae pulp, a tiliaceae pulp, and a poaceae pulp.

DESCRIPTION OF EMBODIMENTS

Hereinafter, an embodiment of the present invention will be described in detail.

A separator for an aluminum electrolytic capacitor of the present invention is a separator for an aluminum electrolytic capacitor interposed between a positive electrode and a negative electrode of the aluminum electrolytic capacitor and is configured such that a short-circuit rate is no more than 10% when 500 V are applied during separator dielectric breakdown testing.

An aluminum electrolytic capacitor of the present invention includes a positive electrode, a negative electrode, and a separator interposed between the positive electrode and the negative electrode, and the separator for an aluminum electrolytic capacitor of the present invention is used as the separator.

In the separator for an aluminum electrolytic capacitor of the present invention, the separator is preferably made of one or more kinds of materials selected from the group consisting of a malvaceae pulp, a tiliaceae pulp, and a poaceae pulp.

Thus, the separator can be formed at low cost using inexpensive fibers.

The malvaceae pulp, the tiliaceae pulp, and the poaceae pulp used in the present invention are not particularly limited, and any fibers can be used. For example, a kenaf pulp, a jute pulp, a rice straw pulp, a straw pulp, a bamboo pulp, a bagasse pulp, a reed pulp, a sabai grass pulp, a dragon grass pulp, a Lalang grass pulp, and the like are suitably used. One kind of these materials may be used or a mixture of two or more kinds thereof may be used. In addition, these pulps may be subjected to a bleaching treatment, or may be purified like a dissolving pulp or a mercerized pulp.

The malvaceae pulp, the tiliaceae pulp, and the poaceae pulp used in the present invention are preferably subjected to a beating treatment. However, the beating treatment does not necessarily need to be performed depending on a density of a separator to be produced.

In the beating treatment, a beating machine used for preparation of a papermaking raw material, such as a disc refiner, a conical refiner, a high-pressure homogenizer, and a beater, can be used without particular limitation.

As described above, the separator of the present invention is configured such that a short-circuit rate is no more than 10% when 500 V are applied during the separator dielectric breakdown testing.

When the short-circuit rate at the time of applying 500 V during the separator dielectric breakdown testing exceeds 10%, a short circuit is likely to occur in aging testing for aluminum electrolytic capacitors.

It is preferable to use a cylinder multilayer paper machine for papermaking of the separator of the present invention. A cylinder paper machine is a paper machine that adopts a method of rotating a cylindrical tube with the net (hereinafter abbreviated as "cylinder") in a tank containing a pulp suspension and forming a paper layer on the net when water flows into the cylindrical tube through the net due to a water level difference. When the paper layer is formed, a pulp is deposited on the net at an initial stage, but the net is gradually clogged at subsequent stages, and thus, a fine pulp and parenchymal cells having flowed out together with water at the initial stage are also included in the paper layer in an intermediate and subsequent stages. Therefore, paper made by the cylinder paper machine generally has a different ratio of parenchymal cells existing on the front and back.

The malvaceae pulp, the tiliaceae pulp, and the poaceae pulp contain many parenchymal cells. The parenchymal cell is very wide and short as compared with a pulp, and thus, adversely affects impedance characteristics and tensile strength of a separator.

In the present invention, it is preferable to use a plurality of the cylinders in order to reduce the number of parenchymal cells remaining in a separator. That is, when a plurality of paper layers made of a material at only the initial stage of paper layer formation, that is, a plurality of paper layers having a low content of parenchymal cells are superimposed on each other to form one separator, the number of parenchymal cells in the separator can be greatly reduced. The short-circuit resistance performance and impedance characteristics, which can be used as the separator for an aluminum electrolytic capacitor, can be realized by controlling the number of parenchymal cells in the separator even with the separator made only of the malvaceae pulp, the tiliaceae pulp, and the poaceae pulp.

When the same raw material is used for papermaking, the cylinder paper machine can control a weight per unit area of paper (hereinafter abbreviated as "basis weight") by changing a pulp suspension concentration and a cylinder rotation speed. Therefore, when paper of the same basis weight is produced at the same speed, for example, the pulp suspension concentration can be reduced to about half by changing from one cylinder to two cylinders. As the pulp suspension concentration decreases, more parenchymal cells in the separator can be reduced. The pulp suspension concentration is preferably no more than 0.3%.

In the present invention, a size of an opening of a net is also important. A general size of a parenchymal cell is about (20 to several tens of µm)×(20 to 150 µm), and the opening of the net is preferably 0.1 mm or more×0.1 mm or more in order to promote outflow of the parenchymal cell.

The impedance characteristics of the separator can be improved by significantly reducing the number of parenchymal cells in a separator, and the impedance characteristics at the same level as those of a cylinder multilayer separator made of a Manila hemp pulp, an esparto pulp, and the like can be realized even if the malvaceae pulp, the tiliaceae pulp, and the poaceae pulp are used.

As an index of the number of parenchymal cells contained in a separator, it is preferable to set a front-to-back ratio (anti-cylinder contact surface/cylinder contact surface) of the number of parenchymal cells present on the surface of the separator to no more than 5. Note that the number of parenchymal cells is small on the surface in contact with the cylinder and is large on the surface not in contact with the cylinder, and thus, it is difficult to set the front-to-back ratio to less than 1. On the other hand, if the front-to-back ratio is more than 5, the outflow of parenchymal cells becomes insufficient, and the impedance characteristics and tensile strength of the separator are likely to deteriorate. In addition, when a separator having a front-to-back ratio of more than 5 is used in an aluminum electrolytic capacitor, a short-circuit rate is likely to deteriorate along with a decrease in tensile strength or the like.

Note that a ratio of a surface with a large number of parenchymal cells/a surface with a small number of parenchymal cells may be set to no more than 5 when it is difficult to distinguish between the cylinder contact surface and the anti-cylinder contact surface.

When a separator is produced, an additive, such as a dispersant, an antifoaming agent, and a paper strength enhancer, may be used as necessary as long as a function as a capacitor separator is not impaired. Note that a water-soluble polymer may be applied after preparing the separator in a paper strength enhancing treatment.

When papermaking is performed by the cylinder multilayer paper machine, raw materials used for each layer may be the same, or the beating degree and kinds of raw materials may be changed. When the same raw material is used, the process can be simplified.

The malvaceae pulp, the tiliaceae pulp, and the poaceae pulp have a shorter average fiber length than that of the Manila hemp pulp, and thus, have characteristics that it is easy to make the texture of paper uniform and easy to produce a separator excellent in denseness.

However, strength characteristics such as tensile strength and tear strength tend to be poor since the average fiber length is short.

Since it is possible to increase the average fiber length and to improve the strength characteristics by reducing the number of parenchymal cells in a separator, the separator excellent in short-circuit resistance performance can be prepared using the malvaceae pulp, the tiliaceae pulp, and the poaceae pulp.

In the separator according to the present invention, a tensile strength of the separator is preferably no less than 9.8 N/15 mm. In addition, the average fiber length is preferably no less than 1.0 mm in order to realize a tear strength of no less than 200 mN, which is required for a typical separator for an aluminum electrolytic capacitor.

When the tensile strength is less than 9.8 N/15 mm or when the average fiber length is less than 1.0 mm, breakage of the separator is likely to occur at the time of preparing an element of an aluminum electrolytic capacitor.

On the other hand, when the average fiber length becomes too long, entanglement of fibers is likely to occur in the papermaking process, or dispersibility in water deteriorates so that the texture of the separator is likely to collapse.

Although there is no problem even if the average fiber length is too long in the configuration of the present invention, the average fiber length is preferably no more than 4 mm from the viewpoint of ease of handling in the separator production process.

A thickness of the separator is preferably 20 to 120 µm.

A diameter of a fiber cross section is about 10 to 15 µm in the malvaceae pulp, the tiliaceae pulp, and the poaceae pulp. Thus, it is difficult to maintain the strength required for the separator if the thickness is less than 20 µm in the case of providing a plurality of layers formed by the cylinder paper machine.

Making the thickness of the separator more than 120 µm is disadvantageous in terms of downsizing an aluminum electrolytic capacitor.

A density of the separator is preferably 0.25 to 0.70 g/cm$^3$.

If the density is lower than 0.25 g/cm$^3$, the strength of the separator is significantly reduced.

If the density is made higher than 0.70 g/cm$^3$, impedance characteristics of a capacitor significantly deteriorate.

It has been found that the separator for an aluminum electrolytic capacitor, which is made of the malvaceae pulp, the tiliaceae pulp, and the poaceae pulp and is excellent in short-circuit resistance performance and impedance characteristics, can be obtained according to the above configuration of the separator.

The separator for an aluminum electrolytic capacitor of the present invention can be used to prepare the aluminum electrolytic capacitor of the present invention.

For example, the separator is interposed between a positive electrode aluminum foil and a negative electrode aluminum foil and the resultant is wound to form an element. Thereafter, the element is impregnated with an electrolytic solution, and the resultant is sealed after being inserted into a case, whereby the aluminum electrolytic capacitor can be prepared.

EXAMPLES

Hereinafter, various specific examples and comparative examples of the separator for an aluminum electrolytic capacitor according to the present invention and the aluminum electrolytic capacitor including the separator for an aluminum electrolytic capacitor will be described in detail.

[Measurement Methods for Characteristics of Separator and Aluminum Electrolytic Capacitor]

Specific measurement of each characteristic of the separator and the aluminum electrolytic capacitor of the present embodiment was performed under the following conditions and methods.

[CSF Value]

A CSF value is a value measured in accordance with JIS P 8121-2 "Pulps-Determination of drainability-Part 2: Canadian standard freeness method" (ISO 5267-2 'Pulps-Determination of drawability-Part 2: "Canadian Standard" freeness method').

[Thickness, Basis Weight, and Density] A thickness of a separator was measured by a method of folding a sheet into ten sheets in "5.1.3 Case of measuring thickness by folding sheet" using a micrometer in "5.1.1 Measuring instrument and measurement method a) Case of using outer micrometer" specified in "JIS C 2300-2 'Cellulosic papers for electrical purposes-Part 2: Methods of test' 5.1 Thickness".

Regarding a basis weight of a separator, the basis weight of the separator in a bone dry condition was measured by a method specified in "JIS C 2300-2 'Cellulosic papers for electrical purposes-Part 2: Methods of test' 6 Basis weight".

Regarding a density of a separator, the density of the separator in a bone dry condition was measured by a method specified in method B of "JIS C 2300-2 'Cellulosic papers for electrical purposes-Part 2: Methods of test' 7.0A Density".

[Tensile Strength]

A maximum tensile load of a separator in a longitudinal direction (producing direction) was measured with a test width of 15 mm, as a tensile strength, by a method specified in "JIS P 8113 'Paper and board-Determination of tensile properties-Part 2: Constant rate of elongation method'" (ISO 1924-2 'Paper and board-Determination of tensile properties-Part 2: Constant rate of elongation method').

[Average Fiber Length]

An average fiber length is a value of a length load average fiber length of a contour length (center line fiber length) measured using Kajaani Fiberlab Ver. 4 (manufactured by Metso Automation) according to "JIS P 8226-2 'Pulps-Determination of Fibre length by automated optical analysis-Part 2: Unpolarized light method'" (ISO16065-2 'Pulps-Determination of Fibre length by automated optical analysis-Part 2: Unpolarized light method').

[Short-circuit Rate when 500 V Are Applied during Separator Dielectric Breakdown Testing]

A dielectric breakdown voltage of a separator was measured at a total of 100 points by a method specified in "JIS C 2300-2 'Cellulosic papers for electrical purposes-Part 2: Methods of test' 24 Dielectric breakdown strength 24.2.2 Case of direct current Method B 24.1.2.1 Method 2", and a ratio of short circuits at voltages of less than 500 V was calculated defined as a short-circuit rate when 500 V are applied during separator dielectric breakdown testing (hereinafter abbreviated as "short-circuit rate during application of 500 V").

[Front-to-Back Ratio of Number of Parenchymal Cells Present on Separator Surface]

The number of parenchymal cells present on front and back surfaces of a separator of 1000 μm (vertical direction)× 5000 μm (horizontal direction) was measured at a magnification of 200 times using a scanning electron microscope (hereinafter abbreviated as "SEM"). The number of parenchymal cells on the anti-cylinder side was divided by the number of parenchymal cells on the cylinder side to determine the ratio between the front and back of parenchymal cells present on the separator surface (Hereinafter, it is abbreviated as "front-to-back ratio of parenchymal cells").

[Preparation of Aluminum Electrolytic Capacitor Using Separator]

Hereinafter, a method for producing the aluminum electrolytic capacitor using the separator of the present exemplary embodiment will be described.

An element is formed using the separator having the above-described configuration by interposing the separator between a positive electrode aluminum foil and a negative electrode aluminum foil and winding the resultant. Thereafter, the element is impregnated with an electrolytic solution, and the resultant is sealed after being inserted into a case, thereby preparing an aluminum electrolytic capacitor.

[Impedance]

An impedance of the produced aluminum electrolytic capacitor was measured at a frequency of 100 kHz at 20° C. using an LCR meter.

Example 1

A kenaf pulp, which is a malvaceae pulp, was beaten up to a CSF value of 600 ml using a double disc refiner (hereinafter abbreviated as "DDR") to obtain a three-layer separator having a thickness of 50 μm, a basis weight of 27.5 g/m$^2$, and a density of 0.55 g/cm$^3$ using a cylinder three-layer paper machine. In this separator, a tensile strength was 43 N/15 mm, an average fiber length was 2.1 mm, a short-circuit rate during application of 500 V was 3%, and a front-to-back ratio of the number of parenchymal cells was 1.5.

This separator was used to prepare 100 capacitor elements. Each of the capacitor elements was impregnated with an EG-based electrolytic solution, and the resultant was sealed after being inserted into a case, thereby obtaining an aluminum electrolytic capacitor having a rated voltage of 100 V, a capacity of 100 μF, a diameter of 12.5 mm, and a length of 20 mm. This aluminum electrolytic capacitor was not short-circuited in aging testing, and an impedance thereof was 0.23Ω.

Example 2

A three-layer separator having a thickness of 115 μm, a basis weight of 31.1 g/m$^2$, and a density of 0.27 g/cm$^3$ was obtained from an unbeaten jute pulp, which is a tiliaceae pulp, having a CSF value of 650 ml using a cylinder three-layer paper machine. In this separator, a tensile strength was 47 N/15 mm, an average fiber length was 1.8 mm, a short-circuit rate during application of 500 V was 0%, and a front-to-back ratio of the number of parenchymal cells was 1.2.

This separator was used to prepare 100 capacitor elements. Each of the capacitor elements was impregnated with an EG-based electrolytic solution, and the resultant was sealed after being inserted into a case, thereby obtaining an aluminum electrolytic capacitor having a rated voltage of 100 V, a capacity of 100 μF, a diameter of 12.5 mm, and a length of 20 mm. This aluminum electrolytic capacitor was not short-circuited in aging testing, and an impedance thereof was 0.25Ω.

Example 3

A jute pulp, which is a tiliaceae pulp, was beaten up to a CSF value of 620 ml using DDR to obtain a three-layer separator having a thickness of 125 μm, a basis weight of 37.5 g/m$^2$, and a density of 0.30 g/cm$^3$ using a cylinder three-layer paper machine. In this separator, a tensile strength was 56 N/15 mm, an average fiber length was 1.8 mm, a short-circuit rate during application of 500 V was 0%, and a front-to-back ratio of the number of parenchymal cells was 1.5.

This separator was used to prepare 100 capacitor elements. An attempt was made to impregnate each of the capacitor elements with an EG-based electrolytic solution, and insert and seal the resultant in a case so as to prepare an aluminum electrolytic capacitor having a rated voltage of 100 V, a capacity of 100 µF, a diameter of 12.5 mm, and a length of 20 mm, but it was impossible to insert the capacitor element in the case because a diameter of the capacitor element was too large due to the influence of the large thickness of the separator. An aluminum electrolytic capacitor prepared by changing the case to a case having a large diameter was not short-circuited in aging testing, and an impedance thereof was 0.32Ω.

Example 4

An esparto pulp, which is a poaceae pulp, was beaten up to a CSF value of 600 ml using DDR to obtain a two-layer separator having a thickness of 50 µm, a basis weight of 25.0 g/m², and a density of 0.50 g/cm³ using a cylinder two-layer paper machine. In this separator, a tensile strength was 11 N/15 mm, an average fiber length was 1.1 mm, a short-circuit rate during application of 500 V was 4%, and a front-to-back ratio of the number of parenchymal cells was 2.8.

This separator was used to prepare 100 capacitor elements. Each of the capacitor elements was impregnated with an EG-based electrolytic solution, and the resultant was sealed after being inserted into a case, thereby obtaining an aluminum electrolytic capacitor having a rated voltage of 100 V, a capacity of 100 µF, a diameter of 12.5 mm, and a length of 20 mm. This aluminum electrolytic capacitor was not short-circuited in aging testing, and an impedance thereof was 0.18Ω.

Example 5

A bamboo pulp, which is a poaceae pulp, was beaten up to a CSF value of 550 ml using DDR to obtain a two-layer separator having a thickness of 40 µm, a basis weight of 20.0 g/m², and a density of 0.50 g/cm³ using a cylinder two-layer paper machine. In this separator, a tensile strength was 25 N/15 mm, an average fiber length was 1.6 mm, a short-circuit rate during application of 500 V was 2%, and a front-to-back ratio of the number of parenchymal cells was 2.2.

This separator was used to prepare 100 capacitor elements. Each of the capacitor elements was impregnated with an EG-based electrolytic solution, and the resultant was sealed after being inserted into a case, thereby obtaining an aluminum electrolytic capacitor having a rated voltage of 100 V, a capacity of 100 µF, a diameter of 12.5 mm, and a length of 20 mm. This aluminum electrolytic capacitor was not short-circuited in aging testing, and an impedance thereof was 0.20Ω.

Example 6

A bagasse pulp, which is a poaceae pulp, was beaten up to a CSF value of 400 ml using DDR to obtain a two-layer separator having a thickness of 22 µm, a basis weight of 15.0 g/m², and a density of 0.68 g/cm³ using a cylinder two-layer paper machine. In this separator, a tensile strength was 14 N/15 mm, an average fiber length was 1.4 mm, a short-circuit rate during application of 500 V was 8%, and a front-to-back ratio of the number of parenchymal cells was 4.8.

This separator was used to prepare 100 capacitor elements. Each of the capacitor elements was impregnated with an EG-based electrolytic solution, and the resultant was sealed after being inserted into a case, thereby obtaining an aluminum electrolytic capacitor having a rated voltage of 100 V, a capacity of 100 µF, a diameter of 12.5 mm, and a length of 20 mm. This aluminum electrolytic capacitor was not short-circuited in aging testing, and an impedance thereof was 0.19Ω.

Example 7

A bagasse pulp, which is a poaceae pulp, was beaten up to a CSF value of 300 ml using DDR to obtain a two-layer separator having a thickness of 22 µm, a basis weight of 16.1 g/m², and a density of 0.73 g/cm³ using a cylinder two-layer paper machine. In this separator, a tensile strength was 18 N/15 mm, an average fiber length was 1.3 mm, a short-circuit rate during application of 500 V was 3%, and a front-to-back ratio of the number of parenchymal cells was 4.9.

This separator was used to prepare 100 capacitor elements. Each of the capacitor elements was impregnated with an EG-based electrolytic solution, and the resultant was sealed after being inserted into a case, thereby obtaining an aluminum electrolytic capacitor having a rated voltage of 100 V, a capacity of 100 ρF, a diameter of 12.5 mm, and a length of 20 mm. This aluminum electrolytic capacitor was not short-circuited in aging testing, but an impedance thereof was 0.29Ω, which is larger than that of the capacitor prepared in Example 6 using the two-layer separator made of the bagasse pulp and having the thickness of 22 µm and the density of 0.68 g/cm³.

Example 8

A dragon grass pulp, which is a poaceae pulp, was beaten up to a CSF value of 650 ml using DDR to obtain a two-layer separator having a thickness of 50 µm, a basis weight of 20.0 g/m², and a density of 0.40 g/cm³ using a cylinder two-layer paper machine. In this separator, a tensile strength was 27 N/15 mm, an average fiber length was 1.5 mm, a short-circuit rate during application of 500 V was 3%, and a front-to-back ratio of the number of parenchymal cells was 1.7.

This separator was used to prepare 100 capacitor elements. Each of the capacitor elements was impregnated with an EG-based electrolytic solution, and the resultant was sealed after being inserted into a case, thereby obtaining an aluminum electrolytic capacitor having a rated voltage of 100 V, a capacity of 100 µF, a diameter of 12.5 mm, and a length of 20 mm. This aluminum electrolytic capacitor was not short-circuited in aging testing, and an impedance thereof was 0.15Ω.

[Conventional Example 1]

A half amount of a Manila hemp pulp, which is a musaceae pulp, and a half amount of an esparto pulp, which is a poaceae pulp, were mixed, and the resultant was beaten up to a CSF value of 550 ml using DDR to obtain a two-layer separator having a thickness of 50 µm, a basis weight of 25.0 g/m², and a density of 0.50 g/cm³ using a cylinder two-layer paper machine. In this separator, a tensile strength was 29 N/15 mm, an average fiber length was 1.9 mm, a short-circuit rate during application of 500 V was 4%, and a front-to-back ratio of the number of parenchymal cells was 1.9.

This separator was used to prepare 100 capacitor elements. Each of the capacitor elements was impregnated with an EG-based electrolytic solution, and the resultant was sealed after being inserted into a case, thereby obtaining an aluminum electrolytic capacitor having a rated voltage of 100 V, a capacity of 100 µF, a diameter of 12.5 mm, and a length of 20 mm. This aluminum electrolytic capacitor was not short-circuited in aging testing, and an impedance thereof was 0.20Ω.

Comparative Example 1

An esparto pulp, which is a poaceae pulp, was beaten up to a CSF value of 600 ml using DDR to obtain a one-layer separator having a thickness of 50 µm, a basis weight of 25.0 g/m², and a density of 0.50 g/cm³ using a cylinder one-layer paper machine. In this separator, a tensile strength was 8 N/15 mm, an average fiber length was 0.9 mm, a short-circuit rate during application of 500 V was 14%, and a front-to-back ratio of the number of parenchymal cells was 6.0.

This separator was used to prepare 100 capacitor elements. Each of the capacitor elements was impregnated with an EG-based electrolytic solution, and the resultant was sealed after being inserted into a case, thereby obtaining an aluminum electrolytic capacitor having a rated voltage of 100 V, a capacity of 100 µF, a diameter of 12.5 mm, and a length of 20 mm. Among the aluminum electrolytic capacitors, a short circuit occurred even in aging testing, but an impedance of the capacitor that was not short-circuited was 0.24Ω.

Comparative Example 2

A bagasse pulp, which is a poaceae pulp, was beaten up to a CSF value of 400 ml using DDR to obtain a two-layer separator having a thickness of 18 µm, a basis weight of 11.5 g/m², and a density of 0.64 g/cm³ using a cylinder two-layer paper machine. In this separator, a tensile strength was 7 N/15 mm, an average fiber length was 1.5 mm, a short-circuit rate during application of 500 V was 72%, and a front-to-back ratio of the number of parenchymal cells was 3.3.

When an attempt was made to prepare a capacitor element using this separator, breakage of the separator frequently occurred at the time of preparing an element due to the weak tensile strength, and it was impossible to prepare the capacitor element.

Comparative Example 3

A two-layer separator having a thickness of 50 µm, a basis weight of 12.0 g/m², and a density of 0.24 g/cm³ was obtained from an unbeaten esparto pulp, which is a poaceae pulp, having a CSF value of 660 ml using a cylinder two-layer paper machine. In this separator, a tensile strength was 4 N/15 mm, an average fiber length was 1.2 mm, a short-circuit rate during application of 500 V was 80%, and a front-to-back ratio of the number of parenchymal cells was 2.1.

When an attempt was made to prepare a capacitor element using this separator, breakage of the separator frequently occurred at the time of preparing an element due to the weak tensile strength, and it was impossible to prepare the capacitor element.

Table 1 shows evaluation results of the impedances of the separators and the capacitors with the rated voltage of 100 V according to Examples 1 to 8, Comparative Examples 1 to 3, and Conventional Example 1.

TABLE 1

| | PULP | TYPE | CSF ml | THICKNESS µm | BASIS WEIGHT g/m² | DENSITY g/cm³ | TENSILE STRENGTH N/15 mm | AVERAGE-FIBER LENGTH mm | SHORT-CIRCUIT RATE DURING APPLICATION OF 500 V % | PARENCHYMAL CELL RATIO | CAPACITOR IMPEDANCE Ω |
|---|---|---|---|---|---|---|---|---|---|---|---|
| EXAMPLE1 | MALVACEAE KENAF PULP | THREE LAYERS | 600 | 50 | 27.5 | 0.55 | 43 | 2.1 | 3 | 1.5 | 0.23 |
| EXAMPLE2 | TILIACEAE JUTE PULP | THREE LAYERS | 650 | 115 | 31.1 | 0.27 | 47 | 1.8 | 0 | 1.2 | 0.25 |
| EXAMPLE3 | TILIACEAE JUTE PULP | THREE LAYERS | 620 | 125 | 37.5 | 0.30 | 56 | 1.8 | 0 | 1.5 | 0.32 |
| EXAMPLE4 | POAC'EAE ESPARTO PULP | TWO LAYERS | 600 | 50 | 25.0 | 0.50 | 11 | 1.1 | 4 | 2.8 | 0.18 |
| EXAMPLE5 | POACEAE BAMBOO PULP | TWO LAYERS | 550 | 40 | 20.0 | 0.50 | 25 | 1.6 | 2 | 2.2 | 0.20 |
| EXAMPLE6 | POACEAE BAGASSE PULP | TWO LAYERS | 400 | 22 | 15.0 | 0.68 | 14 | 1.4 | 8 | 4.8 | 0.19 |
| EXAMPLE7 | POACEAE BAGASSE PULP | TWO LAYERS | 300 | 22 | 16.1 | 0.73 | 18 | 1.3 | 3 | 4.9 | 0.29 |
| EXAMPLE8 | POACEAE DRAGON GRASS PULP | TWO LAYERS | 650 | 50 | 20.0 | 0.40 | 27 | 1.5 | 3 | 1.7 | 0.15 |
| CONVENTIONAL EXAMPLE 1 | MUSACEAE MANILA HEMP PULP AND POACEAE ESPARTO PULP | TWO LAYERS | 550 | 50 | 25.0 | 0.50 | 29 | 1.9 | 4 | 1.9 | 0.20 |
| COMPARATIVE EXAMPLE1 | POACEAE ESPARTO PULP | ONE LAYER | 600 | 50 | 25.0 | 0.50 | 8 | 0.9 | 14 | 6.0 | 0.24 |

TABLE 1-continued

|  | PULP | TYPE | CSF ml | THICKNESS μm | BASIS WEIGHT g/m² | DENSITY g/cm³ | TENSILE STRENGTH N/15 mm | AVERAGE-FIBER LENGTH mm | SHORT-CIRCUIT RATE DURING APPLICATION OF 500 V % | PARENCHYMAL CELL RATIO | CAPACITOR IMPEDANCE Ω |
|---|---|---|---|---|---|---|---|---|---|---|---|
| COMPARATIVE EXAMPLE2 | POACEAE BAGASSE PULP | ONE LAYER | 400 | 18 | 11.5 | 0.64 | 7 | 1.5 | 72 | 3.3 | — |
| COMPARATIVE EXAMPLE3 | POACEAE ESPARTO PULP | TWO LAYERS | 660 | 50 | 12.0 | 0.24 | 4 | 1.2 | 80 | 2.1 | — |

As can be seen from Table 1, in the separators of the respective examples, the short-circuit rate during application of 500 V satisfies no more than 10%, and the front-to-back ratio of the number of parenchymal cells is low within a range of 1 to 5.

On the other hand, the short-circuit rate during application of 500 V exceeds 10% in the separators of the respective comparative examples.

All the separators of Example 4, Conventional Example 1, and Comparative Example 1 have the thickness of 50 μm, the basis weight of 25.0 g/m², and the density of 0.50 g/cm³. In addition, raw materials of the separators of Example 4 and Comparative Example 1 are the same.

In the separator of Example 4, the number of parenchymal cells was small, and thus, the tensile strength was strong, the average fiber length was long, and the short-circuit rate during application of 500 V was low. In addition, the impedance of the capacitor also decreased. Even when compared with the separator of Conventional Example 1, the separator of Example 4 shows results that the short-circuit rate during application of 500 V was similar, and the impedance of the capacitor was superior.

Although the short-circuit rate during application of 500 V was 4% and 8% in n the separators of Example 4 and Example 6, respectively, no short circuit occurred in the aluminum electrolytic capacitors during the aging testing. On the other hand, in the separator of Comparative Example 1, the short-circuit rate during application of 500 V was 14% in the aging testing, and short circuits occurred in the aluminum electrolytic capacitors during the aging testing.

The short-circuit rate during application of 500 V and the short circuit of the aluminum electrolytic capacitor during the aging testing are related, and it is necessary to set the short-circuit rate during application of 500 V of the separator to no more than 10% in order to suppress the short circuit of the aluminum electrolytic capacitor during the aging testing.

Example 9

A straw pulp, which is a poaceae pulp, was beaten up to a CSF value of 350 ml using DDR to obtain a two-layer separator having a thickness of 90 μm, a basis weight of 54.0 g/m², and a density of 0.60 g/cm³ using a cylinder two-layer paper machine. In this separator, a tensile strength was 70 N/15 mm, an average fiber length was 1.3 mm, a short-circuit rate during application of 500 V was 0%, and a front-to-back ratio of the number of parenchymal cells was 4.5.

This separator was used to prepare 100 capacitor elements. Each of the capacitor elements was impregnated with a GBL-based electrolytic solution, and the resultant was sealed by being inserted into a case, thereby obtaining an aluminum electrolytic capacitor having a rated voltage of 400 V, a capacity of 10 μF, a diameter of 12.5 mm, and a length of 20 mm. This aluminum electrolytic capacitor was not short-circuited in aging testing. It has been confirmed that this separator can also be applied to a so-called medium-high-voltage GBL aluminum electrolytic capacitor.

As described above, according to the present embodiment, it is possible to provide the separator for an aluminum electrolytic capacitor and the aluminum electrolytic capacitor using the separator that are excellent in short-circuit resistance performance and impedance characteristics by using the malvaceae pulp, the tiliaceae pulp, the poaceae pulp which are stably available over a medium to long term and are inexpensive.

Examples in which the separator of the present embodiment is used for the aluminum electrolytic capacitor have been described above.

Although details of other configurations and producing methods of the aluminum electrolytic capacitor are omitted, electrode materials and electrolytic solution materials are not particularly limited, and various materials can be used in the aluminum electrolytic capacitor of the present invention. In addition, it is also possible to use a plurality of the separators of the present invention or a plurality of separators stacked with one or more layers of the separator of the present invention and other separators as long as an outer diameter of an element is allowable.

The invention claimed is:

1. A separator for an aluminum electrolytic capacitor, interposed between a positive electrode and a negative electrode of the aluminum electrolytic capacitor,
    the separator having a short-circuit rate of no more than 10% when 500 V are applied during separator dielectric breakdown testing, a thickness of 20 to 120 μm, and a density of 0.25 to 0.70 g/cm³,
    the separator being made of one or more kinds of material selected from a group consisting of a malvaceae pulp, a tiliaceae pulp, and a poaceae pulp, and
    a front-to-back ratio of the number of parenchymal cells present on a surface of the separator being no more than 5.

2. An aluminum electrolytic capacitor comprising a positive electrode, a negative electrode, and a separator interposed between the positive electrode and the negative electrode, wherein
    the separator for the aluminum electrolytic capacitor according to claim 1 is used as the separator.

* * * * *